US012693377B1

(12) United States Patent
Bumb et al.

(10) Patent No.: US 12,693,377 B1
(45) Date of Patent: Jul. 28, 2026

(54) RADAR DETECTION FILTERING APPROACH

(71) Applicant: Amazon Technologies, Inc., Seattle, WA (US)

(72) Inventors: Cornel Bumb, Timisoara (RO); Marius Olaru, Iasi (RO); Lucian Ungurean, Timisoara (RO); Gabriel Carstoiu, Timisoara (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 258 days.

(21) Appl. No.: 18/542,343

(22) Filed: Dec. 15, 2023

(51) Int. Cl.
    *G01S 7/35* (2006.01)
    *G01S 13/536* (2006.01)

(52) U.S. Cl.
    CPC ............ *G01S 7/354* (2013.01); *G01S 13/536* (2013.01); *G01S 7/358* (2021.05)

(58) Field of Classification Search
    CPC ......... G01S 7/354; G01S 7/358; G01S 13/536
    USPC ......................................................... 342/109
    See application file for complete search history.

(56) References Cited

U.S. PATENT DOCUMENTS

| | | | | |
|---|---|---|---|---|
| 9,599,702 | B1* | 3/2017 | Bordes | G01S 13/18 |
| 2017/0363737 | A1* | 12/2017 | Kaino | G01S 13/345 |
| 2020/0091608 | A1* | 3/2020 | Alpman | H01L 23/66 |
| 2022/0026557 | A1* | 1/2022 | Arbabian | G01S 13/582 |
| 2023/0280461 | A1* | 9/2023 | Kim | G01S 13/89 |
| | | | | 342/175 |

* cited by examiner

*Primary Examiner* — Brady W Frazier
(74) *Attorney, Agent, or Firm* — K&L Gates LLP

(57) ABSTRACT

Technology directed to a radar detection filtering approach is described. Processing logic obtains radar data from a radar unit. The processing logic determines, based on the radar data, that a candidate detection event has occurred. The processing logic determines signal characteristics of the candidate detection event. A confidence score is generated using the signal characteristics. The confidence score is compared to a confidence threshold, and in response to the confidence score satisfying the confidence threshold, a process to capture image(s) or video is activated.

18 Claims, 8 Drawing Sheets

OBTAIN RADAR DATA FROM A RADAR UNIT 702

DETERMINE, BASED ON THE RADAR DATA, THAT A CANDIDATE DETECTION EVENT HAS OCCURRED 704

DETERMINE SIGNAL CHARACTERISTICS OF THE CANDIDATE DETECTION EVENT 706

GENERATE A CONFIDENCE SCORE USING THE SIGNAL CHARACTERISTICS 708

DETERMINE THAT THE CONFIDENCE SCORE SATISFIES A CONFIDENCE THRESHOLD, THE CONFIDENCE THRESHOLD INDICATING A CONFIDENCE THAT THE CANDIDATE DETECTION EVENT IS AN ACTUAL DETECTION EVENT 710

ACTIVATE A PROCESS TO CAPTURE ONE OR MORE OF AN IMAGE OR VIDEO IN RESPONSE TO THE CONFIDENCE SCORE SATISFYING THE CONFIDENCE THRESHOLD 712

700

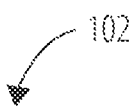
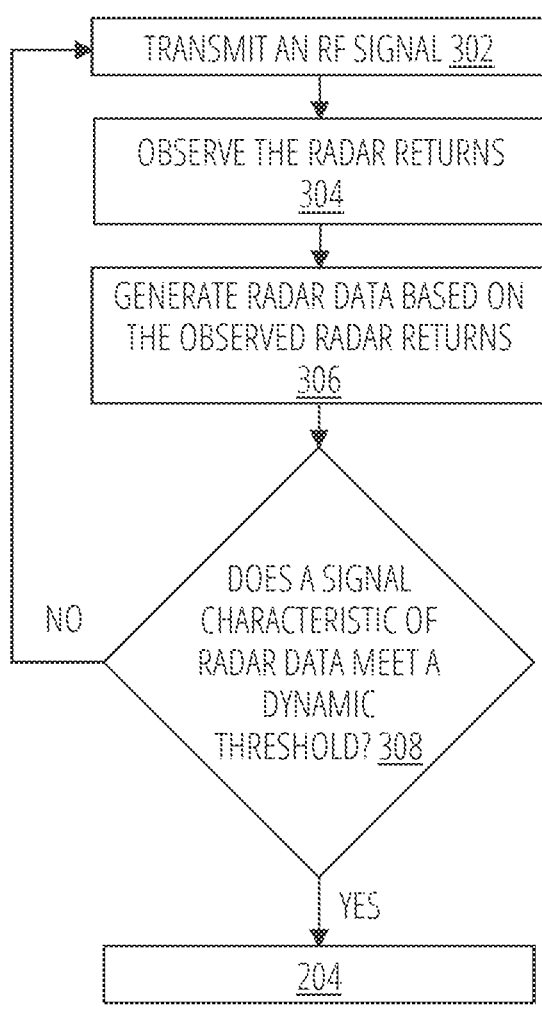
TRANSMIT AN RF SIGNAL 302
OBSERVE THE RADAR RETURNS
304
GENERATE RADAR DATA BASED ON
THE OBSERVED RADAR RETURNS
306
DOES A SIGNAL
CHARACTERISTIC OF
RADAR DATA MEET A
DYNAMIC
THRESHOLD? 308
NO
YES
204
FIG. 3

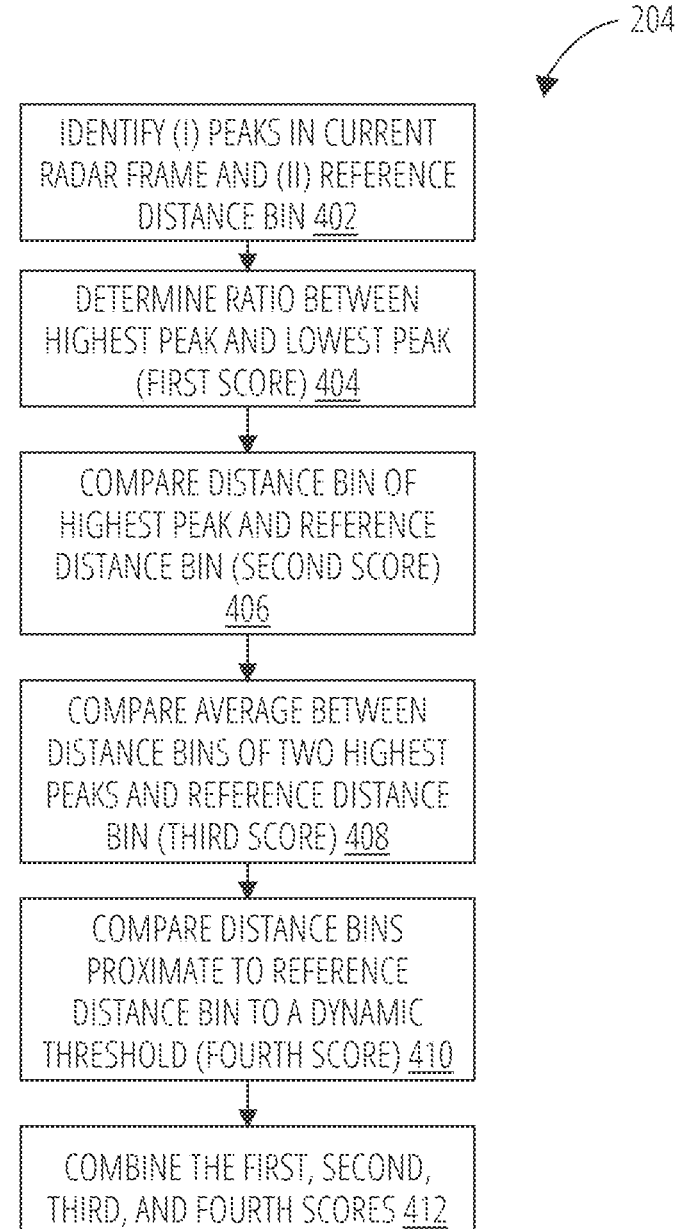

204

IDENTIFY (I) PEAKS IN CURRENT RADAR FRAME AND (II) REFERENCE DISTANCE BIN 402

DETERMINE RATIO BETWEEN HIGHEST PEAK AND LOWEST PEAK (FIRST SCORE) 404

COMPARE DISTANCE BIN OF HIGHEST PEAK AND REFERENCE DISTANCE BIN (SECOND SCORE) 406

COMPARE AVERAGE BETWEEN DISTANCE BINS OF TWO HIGHEST PEAKS AND REFERENCE DISTANCE BIN (THIRD SCORE) 408

COMPARE DISTANCE BINS PROXIMATE TO REFERENCE DISTANCE BIN TO A DYNAMIC THRESHOLD (FOURTH SCORE) 410

COMBINE THE FIRST, SECOND, THIRD, AND FOURTH SCORES 412

FIG. 4

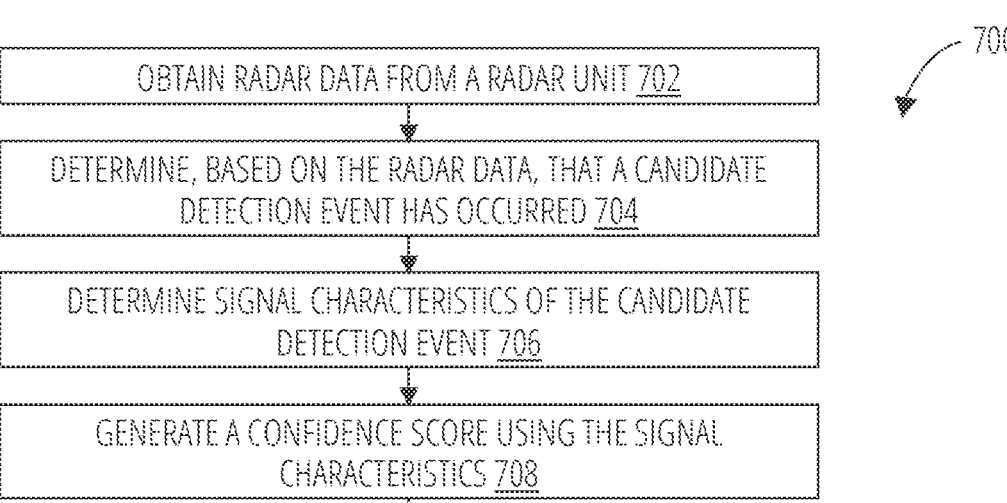

700

OBTAIN RADAR DATA FROM A RADAR UNIT 702

DETERMINE, BASED ON THE RADAR DATA, THAT A CANDIDATE DETECTION EVENT HAS OCCURRED 704

DETERMINE SIGNAL CHARACTERISTICS OF THE CANDIDATE DETECTION EVENT 706

GENERATE A CONFIDENCE SCORE USING THE SIGNAL CHARACTERISTICS 708

DETERMINE THAT THE CONFIDENCE SCORE SATISFIES A CONFIDENCE THRESHOLD, THE CONFIDENCE THRESHOLD INDICATING A CONFIDENCE THAT THE CANDIDATE DETECTION EVENT IS AN ACTUAL DETECTION EVENT 710

ACTIVATE A PROCESS TO CAPTURE ONE OR MORE OF AN IMAGE OR VIDEO IN RESPONSE TO THE CONFIDENCE SCORE SATISFYING THE CONFIDENCE THRESHOLD 712

FIG. 7

RADAR DETECTION FILTERING APPROACH

BACKGROUND

A large and growing population of users are turning to security devices to protect and monitor areas in and around living spaces. Many different types of security devices are used, including devices with antennas to enable transmission of radio frequency (RF) signals.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flow diagram illustrating operations of the detection logic, according to one embodiment.

FIG. 4 is a flowchart illustrating a determination of a confidence score using signal characteristics, according to one embodiment.

FIG. 7 is a flow diagram of a method of activating a process to capture image(s) or video, according to one embodiment.

DETAILED DESCRIPTION

Figure 1:
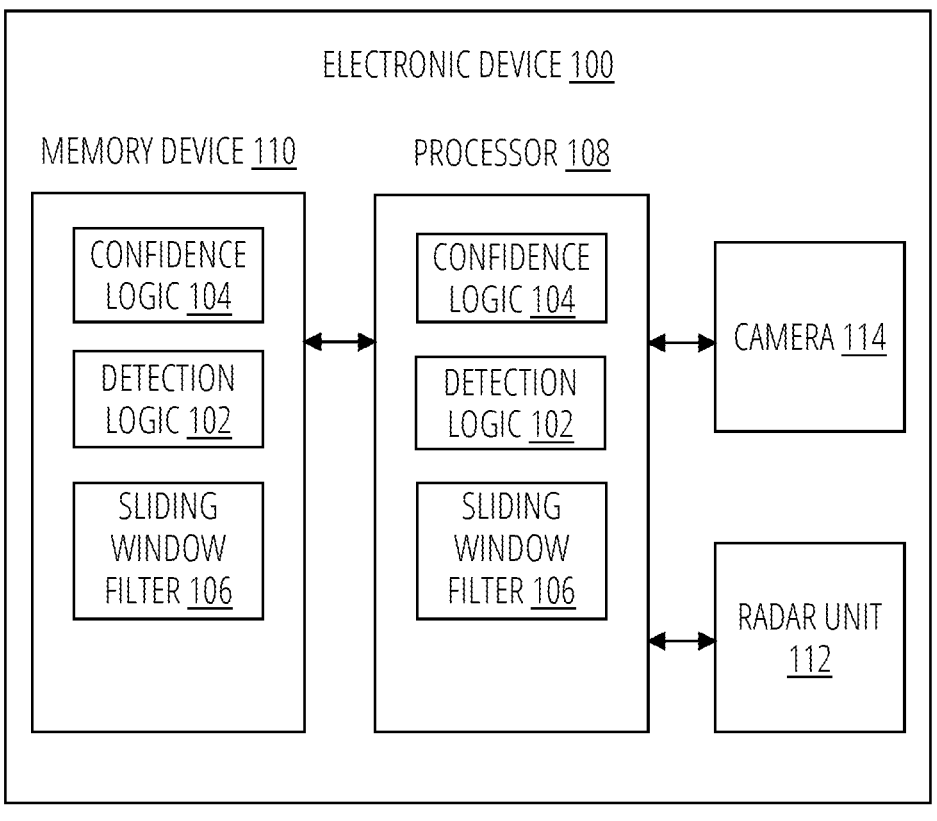
FIG. 1 is a block diagram of an electronic device including detection confidence logic, according to one embodiment.

Technology directed to a radar detection filtering approach for a camera device is described. A camera device, such as a video doorbell device or a security camera device, can perform different data gathering or data analysis operations to capture video or images of an environment. Certain types of activities (e.g., capturing video or images, data-gathering, data analysis, etc.) require more power consumption than others. As such, in applications that may be performed in environments with a limited power supply (such as a battery), it is beneficial to reduce the number of times these higher-power consuming activities are performed. For example, in battery-powered devices that capture video or images and thereafter perform a computer vision analysis, which requires a high amount of power consumption, it may be desired to use a lower-power consuming activity as a threshold to capturing the video or images.

Some camera devices can utilize radar detection to initially trigger recording and/or processing of image or video data captured by a camera. This radar detection can be less power-intensive than image processing. However, due to noise or interference observed alongside the radar returns, the radar detection results may result in false-positive detection events. For battery powered devices utilizing radar, the occurrence of false positive detection events can be costly because the power required to perform image processing or a computer vision analysis is substantial. To mitigate false-positives, a sliding window filter may be used to filter out false-positive errors. For example, a fixed number of radar events may be required within a period of time before performing the higher-power consuming activity.

However, a sliding window filter may introduce unwanted latency before determining that a detection event has occurred. Thus, in cases where the signal characteristics analysis confidently results in a detection event, the application may want to bypass the sliding window filter.

Aspects and embodiments of the present disclosure address the above and other deficiencies by providing a method of initiating a motion detection event analysis based on signal characteristics of radar detection results. Aspects and embodiments of the present disclosure provide a bypass to a sliding window filter for filtering out false-positive detection events (i.e., motion detection events that do not correspond to actual motion of an object) before initializing a motion detection event analysis that include higher-power consuming activities, such as a computer vision analysis. Detection logic obtains radar data from a radar unit and detects, using signal characteristics of the radar data, a detection event. Confidence logic then determines a confidence score using the signal characteristics of the radar data. The confidence score is compared to a confidence threshold, which when satisfied, indicates a minimum level of certainty that the motion detection event corresponds to actual motion of an object.

FIG. 1 is a block diagram of an electronic device 100 including confidence logic 104, according to one embodiment. The electronic device 100 may include a processor 108 communicatively connected to a memory device 110, a radar unit 112, and a camera 114. The memory device 110 may include one or more sets of instructions including the confidence logic 104, detection logic 102, or sliding window filter 106. The processor 108 may perform one or more instructions related to the confidence logic 104, the detection logic 102, or the sliding window filter 106 stored by the memory device 110. The electronic device 100 may be the same or similar to the electronic device 800, as described below with respect to FIG. 8.

In some embodiments, the radar unit 112 may include one or more antennas to transmit radio frequency (RF) signal(s) (e.g., wireless signals) or observe radar returns. Radar returns are an amount of the transmitted RF signal(s) that was reflected back towards the radar unit 112. In some embodiments, the transmitted RF signal(s) may be a frequency chirp transmitted over a period of time. Observed radar returns corresponding to one or more frequency chirps may be individually stored as a radar frame in memory device 110. In other embodiments, the transmitted RF signal(s) may be RF signal(s) other than frequency chirps that are transmitted over a period of time. In these embodiments, the radar returns corresponding to the transmitted RF signal(s) may also be individually stored as a radar frame in the memory device 110. The radar returns may be filtered by the radar unit 112 or the processor 108 before being stored in the memory device 110. Unless specifically stated otherwise, a radar frame refers to a set of data including signal characteristics of observed radar returns corresponding to earlier-transmitted RF signal(s) over a predetermined period of time. In some embodiments, each radar frame is generated by determining a difference between a most-recent transmitted RF signal(s) (e.g., a most recent frequency chirp) to a second most-recent transmitted RF signal(s) (e.g., a second most-recent frequency chirp, a frequency chirp immediately preceding the most-recent frequency chirp).

In some embodiments, the detection logic 102 is to periodically cause the radar unit 112 to generate radar data by transmitting RF signal(s) (e.g., perform a frequency sweep) and observing the radar returns. The radar data may be generated by observed radar returns of a frequency chirp emitted by the radar unit 112. The memory device 110 may store the radar data as radar frames. Each radar frame may include a timestamp that refers to how recent the respective radar frame was generated. In some embodiments, the radar unit 112 may include logic to generate each radar frame which is then sent to one or more of the memory device 110 or the processor 108. This logic may be software, hardware, firmware, or any combination thereof. In other embodiments, a combination of the memory device 110 and the processor 108 may obtain other data (e.g., time-series in-phase and quadrature (IQ) data or frequency-amplitude data) from the radar unit 112 and perform any noise-filtering or transformations (e.g., Inverse Fast Fourier Transform (IFFT)) on the other data to generate the corresponding radar frame. A current radar frame may be a most-recent radar frame generated by the electronic device 100 as described above.

A current radar frame may include multiple distance bins. In some embodiments, the distance bins may correspond to one or more frequencies of the RF signal(s) transmitted by the radar unit 112. The distance bins may be mapped to at least one respective corresponding frequency. In at least some of these embodiments, the current radar frame may be frequency data that is mapped to corresponding distance bins.

In some embodiments, distance bins may be created by performing an IFFT on frequency-domain data. After a radar unit has emitted a frequency chirp and receives respective radar returns, the frequency shift of these radar returns due to the Doppler effect is proportional to the distance of the reflecting object. By applying an IFFT to these frequency-shifted signals, the frequency domain data is converted back into the time domain. Each discrete time in the resulting time-domain signal corresponds to a discrete distance, which in turn represents a range of distances that include the discrete distance. This process enables the electronic device 100 to discern and measure distances to various objects in its field of view. Each distance bin may have a corresponding signal magnitude value. The signal magnitude value may represent a magnitude of observed radar returns at the corresponding distance bin. The distance bins and corresponding signal magnitude values may be signal character-istics of the current radar frame.

Each distance bin may correspond to a (i) a range of distances and (ii) a discrete distance from the radar unit 112. In embodiments where the current radar frame is frequency data mapped to corresponding distance bins, a width of the range of distances corresponding to each distance bin is proportional to the number of frequency bins contained within the current radar frame. In embodiments where the current radar frame is time-series data, a width of the range of distances corresponding to each distance bin is directly proportional to the number of samples used when perform-ing the IFFT. The discrete distance corresponding to each distance bin may be symbolic of each respective range of distances. For example, the discrete distance corresponding to a distance bin may refer to a lower limit, upper limit, or other location within the range of distances. In some embodiments, each distance bin may also be indexed according to their respective proximity to the radar unit 112.

As an example, an IFFT may cause each range of distances corresponding to distance bins to span approximately one-tenth meter. Here, a first distance bin with an index of "1" may correspond to distances between 0-0.1 meters from the radar unit 112, while a second distance bin with an index of "21" may correspond to distances between 2.1-2.2 meters. In this example, an immediately preceding distance bin to the second distance bin has an index of "20" and corre-sponds to distances between 2-2.1 meters, while a distance bin immediately following the second distance bin has an index of "22" and corresponds to distances between 2.2-2.3 meters. The first distance bin may also correspond to a discrete distance of 0.1 meters, the upper limit of the range of distances corresponding to the first distance bin, while the second distance bin may also correspond to a discrete distance of 2.2 meters.

Responsive to the detection logic 102 generating the current radar frame, the detection logic 102 may compare each signal magnitude value corresponding to a distance bin of the current radar frame to an initial threshold. If the initial threshold is met, the detection logic 102 determines that a candidate detection event has been detected. A candidate detection event is a detection event that may (or may not) correspond to actual motion of an object, such as a person approaching the radar unit 112. Responsive to the detection logic 104 determining that a candidate detection event has occurred within the current radar frame, the confidence logic 104 determines a level of certainty that the candidate detec-tion event is an actual detection event.

The initial threshold may include a same threshold value for each distance bin. In other embodiments, the initial threshold may include different threshold values for each distance bin. In at least some of these embodiments, the initial threshold may be dynamic such that the threshold values are dependent on one or more factors. These factors may include (i) signal magnitude values of historical radar frames (e.g., radar frames that were generated before the current radar frame), (ii) a desired sensitivity of detection of candidate detection events, or (iii) a reference distance bin.

The reference distance bin corresponds to one of the distance bins of the current radar frame. In some embodi-ments, the reference distance bin may correspond to a desired maximum distance for detecting candidate detection events. In other embodiments, the reference distance may correspond to a maximum distance that the electronic device 100 may detect candidate detection events. This maximum distance may be dependent on which frequencies and ampli-tudes are utilized by the radar unit 112 in transmitting the RF signal(s) because the frequency determines the system's resolution and range and the amplitude affects the signal's strength and attenuation, influencing how far the detection logic 102 can effectively detect candidate detection events.

In one embodiment, the initial threshold may be satisfied if at least one signal magnitude value of the current radar frame is higher (e.g., greater than) than the corresponding initial threshold magnitude. In another embodiment, the initial threshold may only be satisfied if multiple signal magnitude values of the current radar frame being higher than their respective initial signal magnitude values. In some embodiments, signal magnitude values corresponding to distance bins beyond the reference distance bin (e.g., further away from the radar unit than the reference distance bin) are not considered. If the initial threshold is met by the current radar frame, the detection logic 102 determines that a candidate detection event has occurred within the current radar frame and may initialize the confidence logic 104. If the initial threshold is not met by the current radar frame, the detection logic 102 does not initialize the confidence logic 104 and waits to compare the initial threshold to a subsequent radar frame.

As illustrated in FIG. 1, the detection logic 102 is performed by the processor 108 of the electronic device 100. However, in some embodiments, the detection logic 102 may be performed, either partially or in its entirety, by the radar unit 112. The radar unit 112 may also store, either partially or in its entirety, instructions related to the detection logic 102. In some embodiments, the radar unit 112 may include hardware components or firmware that perform, either partially or in its entirety, the detection logic 102. In other words, the radar unit 112 may include any combination of software, hardware, or firmware to perform, either partially or entirely, the detection logic 102.

If the initial threshold is met, the confidence logic 104 determines a confidence score using signal characteristics of the current radar frame. The signal characteristics used to determine a confidence score for the current radar frame may include distance bins and corresponding signal magnitude values, as discussed above. The signal characteristics may also include one or more peaks (e.g., magnitude peaks) of the signal magnitude values. A peak refers to a signal magnitude value that is a local maximum. In other words, if a first signal magnitude value at a first distance bin is greater than (i) a second signal magnitude value of an immediately preceding distance bin to the first distance bin and (ii) a third signal magnitude value of a distance bin immediately following the first distance bin, the first signal magnitude value is considered a peak. The signal magnitude values of the current radar frame includes at least a highest peak (e.g., a highest value). The highest peak is a highest signal magnitude value (e.g., an absolute maximum) of the signal magnitude values of a radar frame. The signal characteristics used to determine the confidence score may also include ratios of signal magnitude values. For example, the highest peak of the signal magnitude values of the current radar frame may be divided by a different peak of the signal magnitude values to create a ratio between the two peaks. The ratio may be an estimate of signal-to-noise ratio (SNR) of the current radar frame. The signal characteristics used to determine the confidence score may also include a proximity of one or more peaks of the signal magnitude values to the reference distance bin. The signal characteristics used to determine the confidence score may also include attenuation, doppler shifts, multipath effects, target fluctuation, pulse repetition frequency (PRF) effects, or radar cross section (RCS) variations. The confidence logic 104 and the confidence score are described in greater detail with respect to FIG. 4.

Responsive to the confidence logic 104 determining the confidence score for the candidate detection event, the confidence logic 104 compares the confidence score to a confidence threshold. The confidence threshold may represent a level of certainty that the candidate detection event of the current radar frame indicates actual motion of an object, such as a tree branch falling or a person approaching a front door of a home. If the confidence score satisfies the confidence threshold, a sliding window filter may be bypassed and subsequent processing, such capturing image(s) or video from the camera 114 and performing a computer vision analysis of the captured image(s) or video. The sliding window filter may be bypassed because, by the confidence score satisfying the confidence threshold, the confidence score indicates at least a minimum level of certainty that the candidate detection event is an actual motion detection event. However, if the confidence score does not satisfy the confidence threshold, the sliding window filter is not bypassed. Instead, a counter of the sliding window filter is incremented.

A sliding window filter is a signal processing technique where a fixed-size window moves across sets or frames of data and filters unwanted fluctuations in the data. By applying a sliding window filter, short-term fluctuations in the data may be ignored entirely. The fixed-size window may be configured to apply to data that was most-recently aggregated or obtained. As applied in the present disclosure, the sliding window filter 106 may be configured to apply to a number of most-recent radar frames. The most-recent radar frames include the current radar frame (i.e., the most-recent radar frame) and a number of historical radar frames that correspond to most-recently observed radar returns. In some embodiments, the sliding window filter 106 may be configured to apply to data received within a time window. For example, the time window may only allow the sliding window filter 106 to be applied to data obtained within two seconds of the current time. The sliding window filter is effective in reducing false-positive detections of detection events, which often occur due to temporary spikes or noise, by ensuring that only consistent detection of candidate detection events will trigger subsequent computation, such as a computer vision analysis of captured image(s) or video. Consequently, the sliding window filter 106 prevents unnecessary computations and power consumption that would result from reacting to these transient or erroneous signals, thus improving longevity of a limited power source. However, the sliding window filter 106 may be bypassed when a minimum level of certainty exists that the candidate detection event is an is an actual motion detection event (i.e., corresponds to actual motion of an object). The sliding window filter is described in more detail with respect to FIG. 3.

Figure 2:
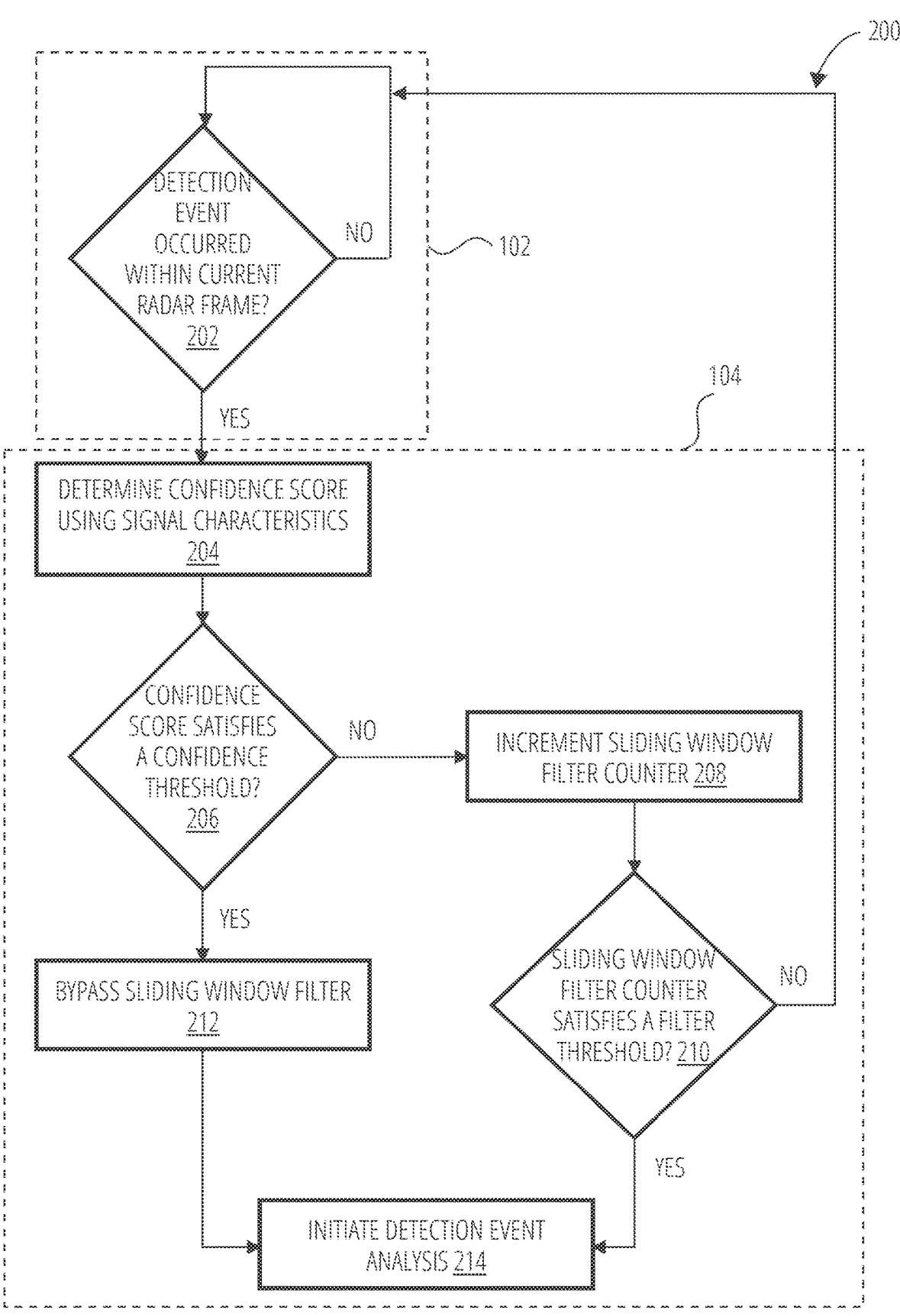
FIG. 2 is a flow diagram of the detection logic and the confidence logic for initiating a motion event analysis, according to one embodiment.

FIG. 2 is a flow diagram 200 of operations of the detection logic 102 and the confidence logic 104, according to one embodiment. The flow diagram 200 may be implemented by hardware, software, firmware, or a combination thereof. In at least one embodiment, the flow diagram 200 is performed by a processing logic comprising hardware, software, firmware, or a combination thereof. The processing logic may be a processing device, such as the processor 108 of FIG. 1, a computing device, a wireless device, or other electronic devices. In some embodiments, the processing logic may be comprised of multiple processing devices. In at least one embodiment, an electronic device performs the operations of the flow diagram 200, such as the electronic device 100 of FIG. 1 or electronic device 800 of FIG. 8. Alternatively, the operations of the flow diagram 200 can be performed by other devices.

At decision block 202, processing logic may determine whether a candidate detection event occurred within a current radar frame. As described above with respect to FIG. 1, the processing logic may use one or more signal characteristics of the current radar frame to determine whether a candidate detection event occurred within the current radar frame.

The radar data may be as described above with respect to FIG. 1. In some embodiments, processing logic includes the decision block 202 and the detection logic 102 performs one or more operations related to determining whether may be performed by the detection logic 102. If processing logic determines that a candidate detection event occurred, processing logic then determines a confidence score using signal characteristics of the radar data at block 204. If processing logic does not determine that a candidate detection event occurred, processing logic waits to determine whether a candidate detection event has occurred within a radar frame subsequent to the current radar frame. The detection logic 102 and the decision block 202 are described in more detail below with respect to FIG. 3.

At block 204, processing logic determines a confidence score using signal characteristics of the current radar frame. The confidence score represents a certainty that the candidate detection event indicates actual motion of an object. In some embodiments, the confidence score is an aggregation of sub-scores. In these embodiments, each sub-score may be based on a different signal characteristic of the current radar frame. The confidence score may be expressed in a variety of ways, such as a whole integer or a probability. The signal characteristics that may be used to determine the confidence score are described above with respect to FIG. 1. One embodiment of determining the confidence score for the current radar frame is described below with respect to FIG. 4.

At decision block 206, processing logic determines whether the confidence score for the current radar frame meets a confidence threshold. The confidence threshold may represent a minimum level of confidence (e.g., minimum level of certainty) with which the processing logic may bypass a sliding window filter (e.g., sliding window filter 106) at block 212 and initiate subsequent detection event analysis at block 214. For example, if the confidence score is expressed as an integer between one (1) and one hundred (100), the confidence threshold may be predetermined to be fifty (50). In one embodiment of this example, the confidence threshold may indicate that a fifty percent (50%) confidence is a minimum level of confidence (e.g., 50% false-positive rate) required to bypass the sliding window filter. In another embodiment of this example, a confidence threshold of fifty (50) may actually indicate that an eighty percent (80%) confidence (e.g., 20% false-positive rate) is a minimum level of confidence required to bypass the sliding window filter. If the processing logic determines that the confidence score satisfies the confidence threshold, the processing logic bypasses the sliding window filter at block 212 and initiates detection event analysis at block 214. Conversely, the processing logic determines that the confidence score does not satisfy the confidence threshold, the processing logic increments a counter of the sliding window filter at block 208 and then determines whether the counter of the sliding window filter satisfies a counter threshold at decision block 210.

At decision block 210, the processing logic determines whether the counter of the sliding window filter satisfies the filter threshold. As explained above with respect to FIG. 1, a sliding window filter is a signal processing technique where a fixed-size window moves across sets or frames of data and filters unwanted fluctuations in the data. As applied here, the sliding window filter requires a predetermined number of candidate detection events (i.e., the filter threshold) to occur within the current radar frame and a predetermined number of most-recent historical radar frames. For example, the filter threshold may require four (4) candidate detection events within the most-recent ten (10) radar frames (including the current radar frame). In this example, if three (3) candidate detection events each occurred within one of the most-recent nine (9) historical radar frames, and a candidate detection event occurred within the current radar frame, the filter threshold of the sliding window filter would be satisfied, and the processing logic initiates detection event analysis at block 214. If the filter threshold is not satisfied, processing logic returns to the decision block 202 and waits to determine whether a candidate detection event occurred within a subsequent radar frame.

In some embodiments, the sliding window filter may not include a counter. Instead, the sliding window filter may use a different data structure (e.g., a first-in-first-out (FIFO) buffer, a different type of buffer, etc.) that tracks a predetermined number of most-recent radar frames and determines whether a number of candidate detection events each occurring within one of the most-recent radar frames meets the filter threshold.

At block 214, processing logic initiates detection event analysis. Detection event analysis may include more computationally-expensive and power-hungry activities that are better at determining whether the candidate detection event is actual motion of an object. For example, detection event analysis may include capturing image(s) or video with a camera and thereafter performing a computer vision analysis. The detection event analysis may include other image processing techniques or video processing techniques, such as image processing techniques, histogram analysis, feature extraction, time-series analysis, spectral analysis, three-dimensional reconstruction, semantic analysis, or statistical analysis. The detection event analysis may be performed by the processing logic or by a different processing device.

FIG. 3 is a flowchart illustrating operations of the detection logic 102, according to one embodiment. The operations of the detection logic 102 may be implemented by hardware, software, firmware, or a combination thereof. In at least one embodiment, the operations of the detection logic 102 are performed by a processing logic comprising hardware, software, firmware, or a combination thereof. The processing logic may be a processing device, such as the processor 108 of FIG. 1, a computing device, a wireless device, or other electronic devices. In some embodiments, the processing logic may be comprised of multiple processing devices. In at least one embodiment, an electronic device performs the operations of the detection logic 102, such as the electronic device 100 of FIG. 1 or electronic device 800 of FIG. 8.

Alternatively, the operations of the detection logic 102 can be performed by other devices. The operations of the detection logic 102 may coincide with operation(s) of decision block 202 of FIG. 2.

At block 302, detection logic 102 causes an RF signal to be transmitted. The RF signal may be transmitted in a manner similar to what is described in relation to the radar unit 112 of FIG. 1. For example, the RF signal may be a frequency chirp, or another RF signal designed to generate a clutter map.

At block 304, after the RF signal has been transmitted, the detection logic 102 causes radar returns corresponding to the transmitted RF signal to be observed. In some embodiments, the radar returns may be observed concurrent to transmitting the RF signal. In other embodiments, the RF signal may be comprised of many short pulses at specific frequencies and radar returns for each short pulse may be individually observed. The radar unit 112 of FIG. 1 may be configured to observe the radar returns.

At block 306, the detection logic 102 generates radar data based on the observed radar returns. In some embodiments, the generated radar data may be organized into radar frames, as described above with respect to FIG. 1. Most-recently observed radar returns used to generate a current radar frame.

At block 308, the detection logic 102 compares signal characteristics of the current radar frame to a dynamic threshold. The dynamic threshold may be the same or similar to the initial threshold described above with respect to FIG. 1. The dynamic threshold may be comprised of multiple threshold values that are each dependent on a number of factors, including (i) signal magnitude values of historical radar frames (e.g., radar frames that were generated before the current radar frame), (ii) a desired sensitivity of detection of candidate detection events, or (iii) a reference distance bin. The detection logic 102 may compare each signal magnitude value of the current radar frame to a corresponding threshold value. A threshold value may correspond to a signal magnitude value of the current radar frame if both the threshold value and the signal magnitude value correspond to a same distance bin. In some embodiments, the dynamic threshold may be configured to be compared to a different signal characteristic of the current radar frame, such as an SNR ratio, proximity of peaks to the reference distance bin, or the like. If the compared signal characteristic(s) satisfy the dynamic threshold, the confidence logic 104 may determine a confidence score for the current radar frame at block 204 of FIG. 2. If the compared signal characteristic(s) does not satisfy the dynamic threshold, the detection logic 102 returns to block 302 and causes a subsequent RF signal to be transmitted.

FIG. 4 is a flowchart illustrating a determination of a confidence score by the confidence logic 104 using signal characteristics, according to one embodiment. The operations of the confidence logic 104 described by the flowchart may be implemented by hardware, software, firmware, or a combination thereof. In at least one embodiment, the operations of the confidence logic 104 are performed by a processing logic comprising hardware, software, firmware, or a combination thereof. The processing logic may be a processing device, such as the processor 108 of FIG. 1, a computing device, a wireless device, or other electronic devices. In some embodiments, the processing logic may be comprised of multiple processing devices. In at least one embodiment, an electronic device performs the operations of the confidence logic 104, such as the electronic device 100 of FIG. 1 or electronic device 800 of FIG. 8. Alternatively, the operations of the detection logic 102 can be performed by other devices. The operations of the confidence logic 104 described by the flowchart may coincide with operation(s) of block 204 of FIG. 2.

At block 402, the confidence logic 104 identifies (i) peaks in a current radar frame and (ii) reference distance bin at block 402. As explained above with respect to FIG. 1, the current radar frame includes multiple distance bins that each have a corresponding signal magnitude value. Both the signal magnitude values and the distance bins may be considered signal characteristics of the current radar frame. The distance bins and corresponding signal magnitude values may be used to determine other signal characteristics of the current radar frame, such as peaks. As explained above, a peak refers to a signal magnitude value that is a local maximum. The current radar frame must have at least a highest peak (e.g., absolute maximum of the signal magnitude values). The highest peak may correspond to a first distance bin. However, the current radar frame may have many more peaks than just the highest peak. In some embodiments, the confidence logic 104 may identify a number of the highest peaks and ignore lower peaks. In other embodiments, the confidence logic 104 may identify all peaks of the data. In other embodiments, the confidence logic may identify a first number of highest peaks and a second number of lowest peaks while ignoring peaks in-between the first number and the second number.

The confidence logic 104 may also identify the reference distance bin. As explained above, the reference distance bin may correspond to a desired maximum distance for detecting candidate detection events. The reference distance bin may correspond to a second distance bin. While the reference distance bin itself is not a signal characteristic of the current radar frame, the distance bins and corresponding signal magnitude values may have certain signal characteristics when compared to the reference distance bin.

At block 404, the confidence logic 104 determines a ratio between a highest peak and a lowest peak of the plurality of peaks. Here, the confidence logic 104 may generate a first score that is a sub-score of the confidence score. The confidence logic 104 may identify a number of highest peaks and then generate a ratio between a signal magnitude value of the highest identified peak and a signal magnitude value of the lowest identified peak. A high ratio indicates a higher confidence in the candidate detection event being actual motion of an object. The ratio may be rounded to a whole number and used as the first score. In some embodiments, the ratio may be clipped to a maximum number. In some embodiments, the first score may be a maximum of eight (8), and the ratio may be clipped at 8.

In some cases, the current radar frame may only have one peak: the highest peak. In these embodiments, the signal magnitude value of the highest peak may be used as the first score. In these cases, the first score may still be clipped to a maximum amount.

At block 406, the confidence logic 104 compares the distance bin corresponding to the highest peak to the reference distance bin. Here, the confidence logic 104 may generate a second score that is a sub-score of the confidence score. As explained above, the reference distance bin may correspond to a desired maximum distance for detecting candidate detection events. As such, closer proximity of the highest peak to the reference distance bin indicates a higher confidence that the candidate detection event corresponds to actual motion of an object. The confidence logic 104 may determine a first index of the first distance bin corresponding to the highest peak and a second index corresponding to the reference distance bin. The first index may then be compared to the second index. In some embodiments, the second score may be equal a maximum value of the second score minus a number of indexes between the first index and the second index. For example, if the first index is "201" and the second index is "207", and the second score may be a maximum of eight (8), the second score may be equal to the maximum value of the second score (8) minus the number of indexes between the first index and the second index (6), which is two (2). In some embodiments, the second score may have a minimum limit of zero (0).

In embodiments where the reference distance bin corresponds to a desired maximum distance for detecting candidate detection events, if the first index is greater than the second index (e.g., the highest peak was recorded beyond the desired maximum distance for detecting candidate detection events), the second score may be equal to zero (0) or capped at a lower number than if the first index was less than the second index.

While the above example is described with respect to indexes, the second score may be determined by any manner of comparing a proximity of the highest peak to the reference distance bin. For example, the confidence logic 104 may also determine second score by comparing a first discrete distance corresponding to the highest peak and a second discrete distance corresponding to the reference distance bin.

At block 408, the confidence logic 104 compares an average between distance bins corresponding to two highest peaks to the reference distance bin. Here, the confidence logic 104 may generate a third score that is a sub-score of the confidence score. Multiple peaks clustered around the reference distance bin indicates a higher confidence that the candidate detection event corresponds to actual motion of an object. As such the confidence logic 104 compares an average distance from a radar unit of the identified peaks to a distance from the radar unit of the reference distance bin. This comparison may be performed similar to the indexing example provided above with respect to the second score. For example, in an embodiment where two highest peaks are compared against the reference distance bin, if a first peak has an index of "201", a second peak has an index of "203", and the reference distance bin has an index of "207", and the third score may be a maximum of eight (8), the third score may be equal to the maximum value of the third score (8) minus the number of indexes between the index of the reference distance bin and an average of the index of the first peak and the index of the second peak (5), which is three (3). In some embodiments, the third score may have a minimum limit of zero (0).

While the above example is described with respect to indexes, the third score may be determined by any manner of comparing a proximity of an average distance from the radar unit of multiple peaks to the distance from the radar unit of the reference distance bin. For example, the confidence logic 104 may also determine third score by (i) averaging a first discrete distance corresponding to the first peak and a second discrete distance corresponding to the second peak and (ii) comparing the average to a third discrete distance corresponding to the reference distance bin.

At block 410, the confidence logic 104 compares signal magnitude values corresponding to distance bins proximate the reference distance bin to a dynamic threshold. Here, the confidence logic 104 may generate a fourth score that is a sub-score of the confidence score. The dynamic threshold may be the same or similar to the initial threshold described above with respect to FIG. 1. The dynamic threshold may include a threshold value for each distance bin of the current radar frame. The signal magnitude value for each distance bin is compared to the respective threshold value of the distance bin. The threshold values may be dependent on one or more factors. These factors may include (i) signal magnitude values of historical radar frames (e.g., radar frames that were generated before the current radar frame), (ii) a desired sensitivity of detection of candidate detection events, or (iii) a reference distance bin.

To determine the fourth score, the confidence logic 104 counts a number of distance bins that have a signal magnitude value that satisfies the respective threshold value. Distance bins that have a signal magnitude value that satisfies the respective threshold value may be called crossing bins. In some embodiments, the confidence logic 104 may only consider a subset of crossing bins. In one embodiment, the subset may include only crossing bins with indexes less than the index of the reference distance bin (e.g., distance bins closer to the radar unit). In another embodiment, the subset may only include crossing bins that are close in proximity to the reference distance bin. A greater number of crossing bins close in proximity to the reference distance bin indicates a higher confidence that the candidate detection event corresponds to actual motion of an object. In some embodiments, the confidence logic 104 may give crossing bins different weights when using the crossing bins to determine the fourth score. For example, a first number of crossing bins immediately preceding the reference distance bin may be given a first weight and a second number of crossing bins immediately after the reference distance bin (e.g., further away from the radar unit) may be given a second weight. In some cases, a crossing bin immediately after the reference distance bin may indicate a higher confidence that the candidate detection event corresponds to actual motion of an object than a crossing bin immediately preceding the reference distance bin.

As an example, if an index of a reference distance bin is "207", (i) any crossing bins with an index between "199" and "206" may be given a weight of 0.5, (ii) any crossing bins with an index between "207" and "214" may be given a weight of 1.5, and any crossing bins with an index between "215" and "222" may be given a weight of 0.5. Crossing bins having other index values may not be given a weight. The weights may be combined to generate the fourth score. The fourth score may be capped to a maximum amount (e.g., eight (8)).

At block 412, the confidence logic 104 combines the first, second, third, and fourth scores to determine the confidence score. In some embodiments, the first, second, third, and fourth scores may all be within a same score range (e.g., similarly weighted), such as [0:8]. In other embodiments, one or more of the first, second, third, and fourth scores may be weighted differently. For example, the first score may be within a score range of [0:12] while the second, third, and fourth scores are within a score range of [0:6].

After the first, second, third, and fourth scores are combined to determine the confidence score, the confidence score may then be compared to the confidence threshold as described above with respect to FIGS. 1-2. For example, if each of the first, second, third, and fourth scores may be scored out of eight (8), a maximum confidence score may be thirty-two (32). Here, the confidence threshold may be predetermined to be sixteen (16). This confidence threshold may be predetermined to correspond to a minimum level of confidence desired before bypassing a noise filter, such as the sliding window filter 106 described above with respect to FIG. 1.

Figure 5:
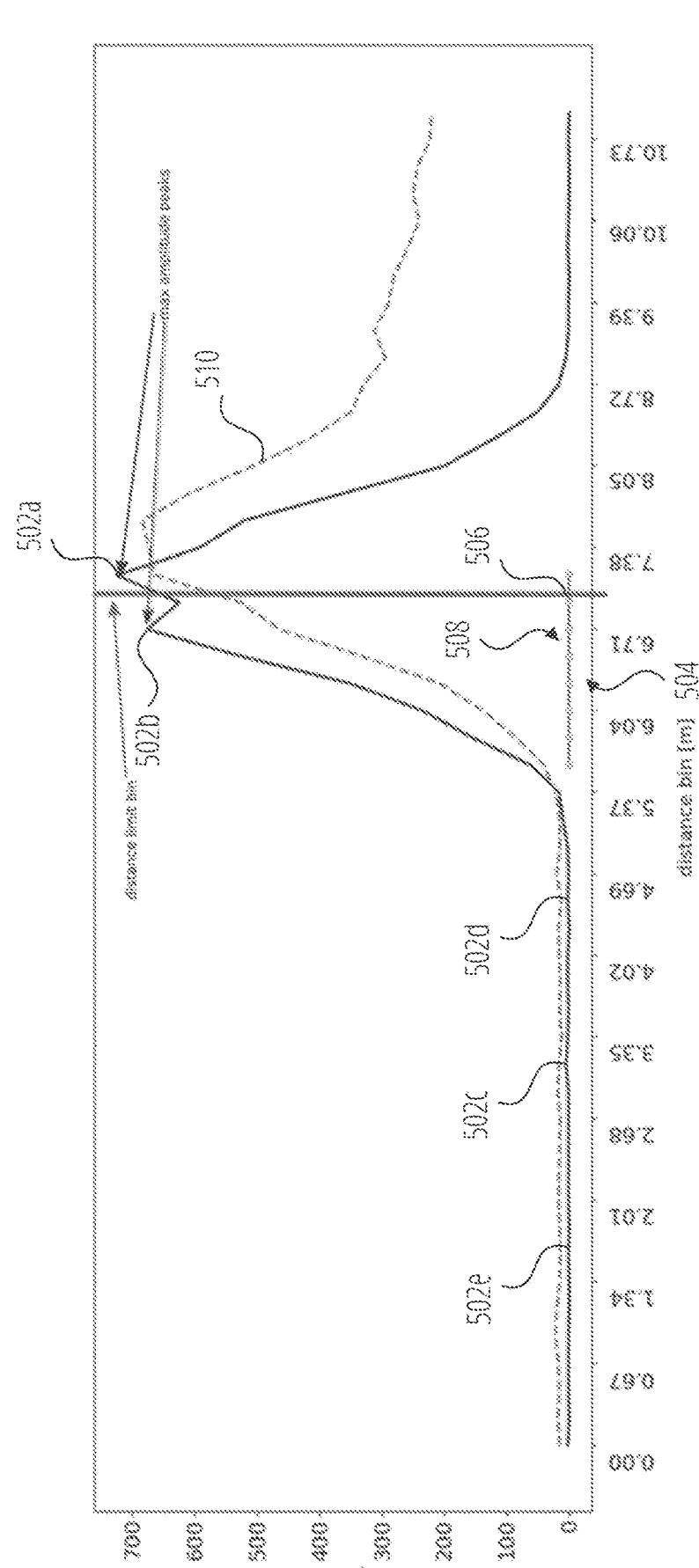
FIG. 5 is a graph illustrating signal characteristics of a first radar frame, according to one embodiment.

FIG. 5 is a graph 500 illustrating signal characteristics of a first radar frame, according to one embodiment. The graph 500 illustrates signal magnitude values (solid line) against distance from a radar unit (x-axis). The graph 500 also illustrates a dynamic threshold 510 (dotted line), as described above with respect to FIGS. 1-4. The first radar frame is an example of a current radar frame illustrating radar returns resulting from an object approaching the radar unit. In some embodiments, a confidence score determined by signal characteristics of the first radar frame would satisfy the confidence threshold as described above with respect to FIGS. 1-2.

The first radar frame includes multiple peaks 502. A first peak 502*a* is a highest peak of the first radar frame (e.g., absolute maximum value). Peaks 502*b-e* are all local maximums. To generate the first score as described in FIG. 4, a ratio is generated by dividing the signal magnitude value of the first peak 502*a* (approx. 800) by the signal magnitude value of the fifth peak 502*e* (approx. 10).

To determine the second score as described in FIG. 4, a distance bin 504 of the first peak 502*a* is compared to the reference distance bin 506. Here, it appears that the distance bin 504 of the first peak 502*a* is immediately next to the reference distance bin 506. However, because the distance bin 504 of the first peak 502*a* is a greater distance than the reference distance bin 506, the second score may be ignored or capped to a smaller amount than if the distance bin 504 of the first peak 502a was a smaller distance than the reference distance bin 506.

To determine the third score as described in FIG. 4, an average distance from the radar unit is generated between a distance bin 504 of the second peak 502b and the distance bin 504 of the first peak 502a is compared to the reference distance bin. In some embodiments, other peaks may also be used to generate the average distance from the radar unit.

To determine the fourth score as described in FIG. 4, a number of crossing bin 508 proximate the reference distance bin 504 is determined. A distance bin 504 is a crossing bin 508 if the signal magnitude value corresponding to the distance bin 504 is greater than the dynamic threshold 510.

Figure 6:
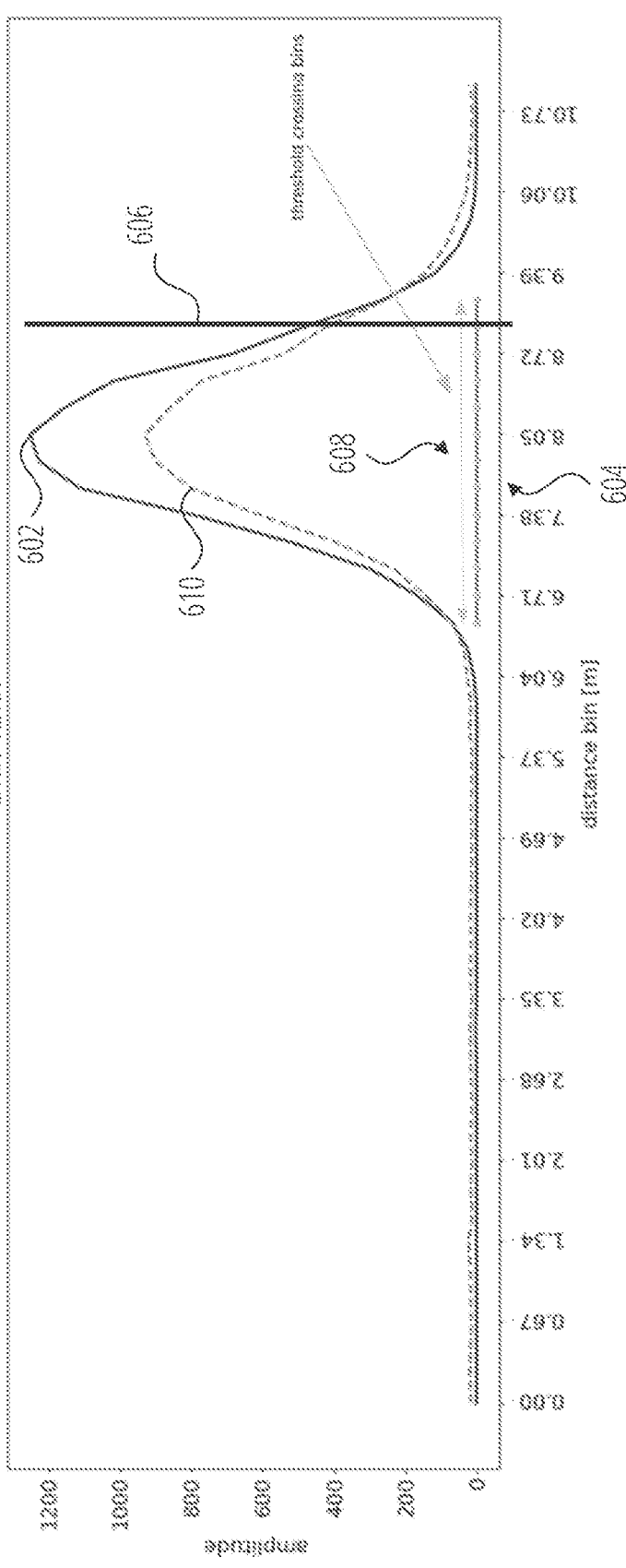
FIG. 6 is a graph illustrating signal characteristics of a second radar frame, according to one embodiment.

FIG. 6 is a graph 600 illustrating signal characteristics of a second radar frame, according to one embodiment. The graph 600 illustrates signal magnitude values (solid line) against distance from a radar unit (x-axis). The graph 600 also illustrates a dynamic threshold 610 (dotted line), as described above with respect to FIGS. 1-4. The second radar frame is an example of a current radar frame illustrating radar returns resulting from an object moving radially with respect to the radar unit (e.g., the radar unit near a front door of a home and a person walking on a sidewalk in front of the home). In some embodiments, a confidence score determined by signal characteristics of the second radar frame would satisfy the confidence threshold as described above with respect to FIGS. 1-2.

The second radar frame may only include one peak 602. The peak 602 may be used as the first score as described in FIG. 4, as there is not another peak with which to generate a ratio.

To determine the second score as described in FIG. 4, a distance bin 604 of the peak 602 is compared to the reference distance bin 606. Here, it appears that the distance bin 604 of the peak 602 is immediately next to the reference distance bin 506. However, because the distance bin 504 of the first peak 502a is a greater distance than the reference distance bin 506, the second score may be ignored or capped to a smaller amount than if the distance bin 504 of the first peak 502a was a smaller distance than the reference distance bin 506.

In determining a confidence score for the second radar frame, the third score as described in FIG. 4 may be ignored as the second radar frame has only one peak 602 in some embodiments. In other embodiments, the third score may be identical to the second score.

To determine the fourth score as described in FIG. 4, a number of crossing bin 608 proximate the reference limit distance bin 604 is determined. A distance bin 604 is a crossing bin 608 if the signal magnitude value corresponding to the distance bin 604 is greater than the dynamic threshold 610.

FIG. 7 is a method 700 of activating a process to capture image(s) or video, according to one embodiment. The method 700 may be implemented by hardware, software, firmware, or a combination thereof. In at least one embodiment, the method 700 is performed by a processing logic comprising hardware, software, firmware, or a combination thereof. The processing logic may be a processing device, such as the processor 108 of FIG. 1, a computing device, a wireless device, or other electronic devices. In some embodiments, the processing logic may be comprised of multiple processing devices. In at least one embodiment, an electronic device performs the operations of the confidence logic 104, such as the electronic device 100 of FIG. 1 or electronic device 800 of FIG. 8. Alternatively, the operations of the detection logic 102 can be performed by other devices.

At block 702, processing logic obtains radar data from a radar unit.

At block 704, processing logic determines, based on the radar data, that a candidate detection event has occurred.

At block 706, processing logic determines signal characteristics of the candidate detection event.

At block 708, processing logic generates a confidence score using the signal characteristics.

At block 710, processing logic determines that the confidence score satisfies a confidence threshold, the confidence threshold indicating a confidence that the candidate detection event is an actual detection event.

At block 712, processing logic activates a process to capture one or more of an image or video in response to the confidence score satisfying the confidence threshold.

Figure 8:
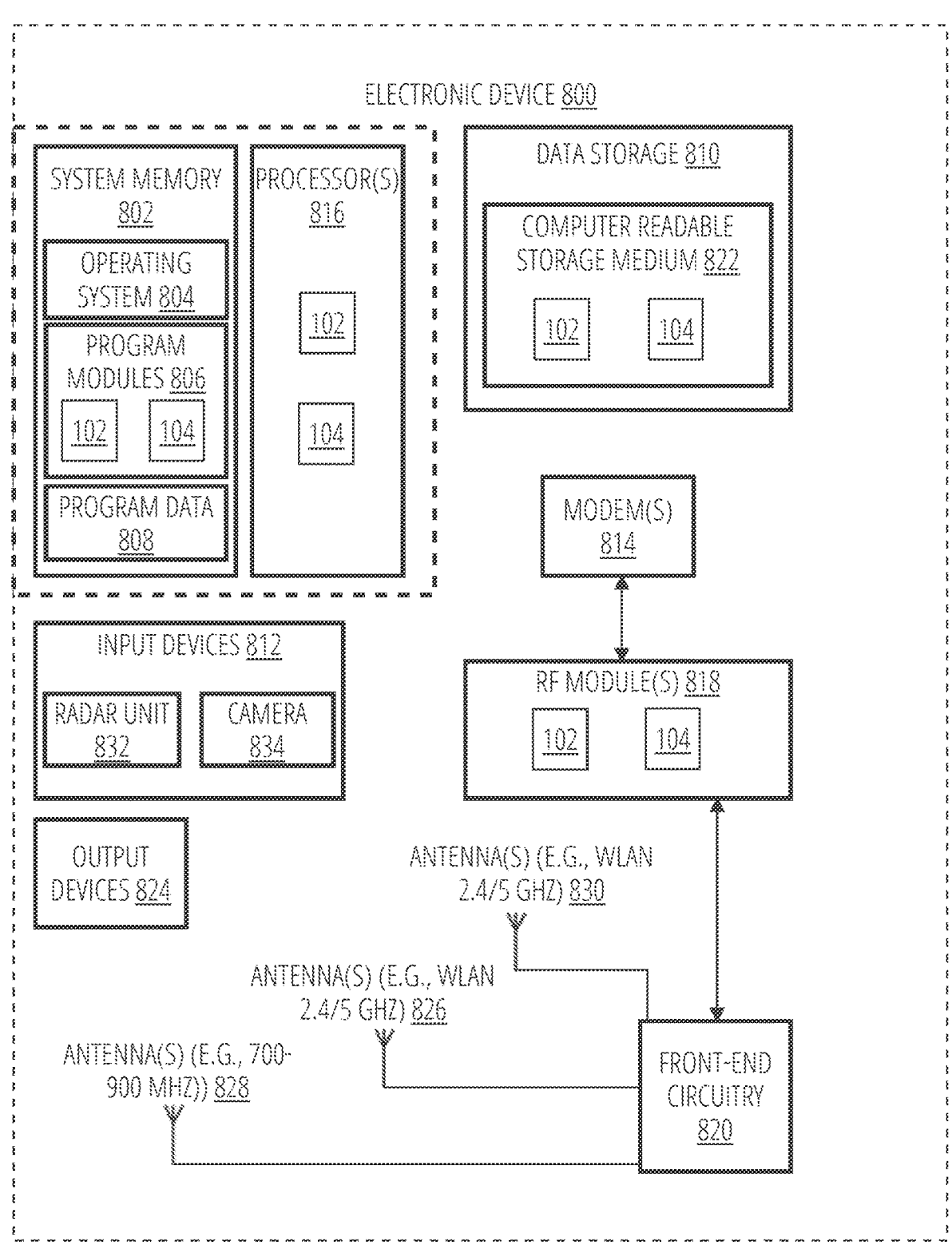
FIG. 8 is a block diagram of an electronic device with detection confidence logic for bypassing a sliding window filter, according to one embodiment.

FIG. 8 is a block diagram of an electronic device 800 with confidence logic 104 for bypassing a sliding window filter, according to one embodiment. The confidence logic 104 can be software executed by the electronic device 800 to perform the operations described herein. The confidence logic 104 can be firmware or hardware of the electronic device 800 to perform the operations described herein. The electronic device 100 may be the same as the electronic device 800.

The electronic device 800 includes one or more processor(s) 816, such as one or more central processing units (CPUs), microcontrollers, field-programmable gate arrays, or other types of processing devices. The electronic device 800 also includes system memory 802, which may correspond to any combination of volatile and/or non-volatile storage mechanisms (e.g., one or more memory devices). The system memory 802 stores information that provides an operating system 804, various program modules 806, program data 808, and/or other components. In one embodiment, the system memory 802 stores instructions of methods to control the operation of the electronic device 800. The electronic device 800 performs functions using the processor(s) 816 to execute instructions provided by the system memory 802. In one embodiment, the program modules 806 may include the confidence logic 104 described herein.

In at least one embodiment, a processing device is operatively coupled to a memory device that stores instructions. The processing device executes instructions to perform various operations of the confidence logic 104 described herein.

The electronic device 800 also includes a data storage device data storage 810 that may be composed of one or more types of removable storage and/or one or more types of non-removable storage. The data storage device data storage 810 includes a computer-readable computer readable storage medium 822 on which is stored one or more sets of instructions embodying any of the methodologies or functions described herein. The computer readable storage medium 822 may store each set of radar data used in the confidence logic 104. Instructions for the program modules 806 (e.g., confidence logic 104) may reside, completely or at least partially, within the computer-readable computer readable storage medium 822, system memory 802, and/or within the processor(s) 816 during execution thereof by the electronic device 800, the system memory 802 and the processor(s) 816 also constituting computer-readable media.

The electronic device 800 may include one or more input devices 812. The input devices 812 may include radar unit 832. The radar unit 832 may include antenna(s) connected to radio frequency (RF) circuitry 820, such as antenna(s) 826, 828, 830. The antenna(s) may be Global Positioning System (GPS) antennas, Near Field Communications (NFC) antennas, other WAN antennas, wireless local area network (WLAN) antennas or PAN antennas, or the like. The antenna(s) may be directional, omnidirectional, or non-directional antennas. The radar unit 832 may be configured to send or receive RF signals that are then used to generate radar data used by the confidence logic 104. In one embodiment, the radar unit 832 is used to both transmit an RF signal, such as a chirp, and observe the radar returns. The radar unit 832 may include (i) antennas that both send the RF signal and observe the radar returns or (ii) a first number of antennas to transmit the RF signal and a second number of antennas used to observe the radar returns. In some embodiments, the RF signal transmitted by the radar unit 832 may be a frequency chirp (e.g., a signal in which the frequency increases or decreases with time). In other embodiments, other RF signals may be used (e.g., RF signal(s) designed to generate clutter maps or differentiate between stationary clutter and moving targets). A clutter map refers to a visual or data representation used to identify objects that reflect a transmitted RF signal (e.g., objects that cause radar returns). The electronic device 800 may include other input devices 812 such as a camera 834. The camera 834 may record video or images used in the computer vision analysis described above with respect to block 214 of FIG. 2. In embodiments where the electronic device 800 is configured as a video doorbell device, a doorbell button may be an input device 812. In other embodiments, other input devices 812 (e.g., keyboard, mouse device, specialized selection keys, etc.) may be included. The electronic device 800 may also include one or more output devices 824, such as displays, audio output mechanisms, or printers. Other output devices 824 may also be included in the electronic device 800.

The electronic device 800 further includes a modem 814 to allow the electronic device 800 to communicate via wireless connections (e.g., provided by the wireless communication system) with other computing devices, such as remote computers, an item-providing system, and so forth. The modem 514 can be connected to one or more radio frequency (RF) RF modules 818. The RF modules 818 may be a WLAN module, a Wide Area Network (WAN) module, a PAN module, GPS module, or the like. Antenna structures (antenna(s) 826, 828, 830) are coupled to the RF circuitry 820, which is coupled to the modem 814. The RF circuitry 820 may include radio front-end circuitry, antenna-switching circuitry, impedance matching circuitry, or the like. The antennas 826, 828, 830 may be GPS antennas, Near Field Communications (NFC) antennas, other WAN antennas, WLAN or PAN antennas, or the like. The modem 814 allows the electronic device 800 to handle both voice and non-voice communications (such as communications for text messages, multi-media messages, media downloads, web browsing, etc.) with a wireless communication system. The modem 814 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 814 may generate signals and send these signals to the antenna(s) 826 of a first type (e.g., WLAN 2.4/5 GHZ), antenna(s) 828 of a second type (e.g., PAN), and/or antenna(s) 830 of a third type (e.g., WLAN 2.4/5 GHZ), via RF circuitry 820, and RF module(s) 818 as described herein. Antennas 826, 828, 830 may be configured to transmit in different frequency bands and/or using different wireless communication protocols. The antennas 826, 828, 830, may be directional, omnidirectional, or non-directional antennas. In addition to sending data, antennas 826, 828, 830 may also receive data, which is sent to appropriate RF modules connected to the antennas. One of the antennas 826, 828, 830 may be any combination of the antenna structures described herein. One or more of the antennas 826, 828, 830 may be the antenna(s) of the radar unit 832 of the input devices 812.

In one embodiment, the electronic device 800 establishes a first connection using a first wireless communication protocol, and a second connection using a different wireless communication protocol. The first wireless connection and second wireless connection may be active concurrently; for example, if a network hardware device is receiving a media item from another network hardware device via the first connection and transferring a file to another user device via the second connection at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 814 is shown to control transmission and reception via the antenna (826, 828, 830), the electronic device 800 may alternatively include multiple modems, each of which is configured to transmit/receive data via a different antenna and/or wireless transmission protocol.

A radar sensor may use a frequency modulated continuous wave (FMCW) approach where a set of one or more frequency modulated chirps and transmitted, and the returning signals are utilized to determine distances to detected objects.

In accordance with one or more implementations, a received signal is mixed with a transmitted signal (e.g. transmitted using an antenna). The received signal represents a reflection of the transmitted signal that has been received after it has reflected off of surfaces and/or objects within the environment (e.g., an environment being monitored by the radar sensor) to generate an intermediate frequency (IF) signal. Specifically, the transmitted and received signals are inputs to an RF mixer that mixes the two inputs together. The result of this mixing is an output signal that has an instantaneous frequency for each time t equal to the difference between the instantaneous frequencies of each of the signals at that time t. The output signal has an instantaneous phase for each time t equal to the difference between the instantaneous phases of each of the signals at that time t.

In accordance with one or more implementations, this IF signal is then filtered with a low pass filter, and then an analog to digital converter is utilized to generate samples representative of the IF signal, e.g. by sampling at a certain rate (such as 10 Hz).

In accordance with one or more implementations, a sample may be stored and manipulated as a complex data object. In accordance with one or more implementations, a complex data object comprises data representing or indicating a magnitude and phase at a respective time t. Each complex data object may represent a complex number indicating the magnitude and phase of the complex data object for a particular time j, where j is from time 1 to $j_{max}$ (the sampling period).

In accordance with one or more implementations, a complex data object may comprise data representing a time t and a complex number a+bi, where a indicates a magnitude and b indicates a phase. In accordance with one or more implementations, this magnitude and phase are represented as a phasor.

In accordance with one or more implementations, a complex data object may comprise data representing a time t and a complex number $(I_n+Q_ni)$ in in-phase and quadrature (IQ) notation. A complex data object may be characterized as representing a complex number taking the form $(I_n+Q_ni)$ for a complex data object n, which may be for example a complex data object corresponding to time j.

A complex data object may comprise a first value corresponding to an I component, and a second value corresponding to a Q component. In traditional signal processing, the I component is commonly characterized as an in-phase component, and the Q component is commonly characterized as a quadrature component, with a signal represented by the complex data objects being understandable as a combination of an in-phase signal represented by the in-phase components and a quadrature signal represented by the quadrature components. A magnitude of the signal represented by an I value and Q value for a particular complex data object can be determined as the square root of the sum of the squares of the I and Q values. A phase of the signal represented by an I value and Q value for a particular complex data object can be determined as the arctangent of the Q value over the I value.

In accordance with one or more implementations, a fast Fourier transform (FFT) algorithm is utilized to generate, based on a set of time-domain complex data objects for an IF signal, a set of frequency-domain complex data objects. Each frequency-domain complex data object can be characterized as corresponding to a distance bucket, with signal for a certain frequency indicating a detected object, or lack thereof, at a corresponding distance.

In accordance with one or more implementations, an FMCW radar sensor can detect motion based on differences between a determined set of frequency-domain complex data objects for a received reflection of a first transmitted signal (e.g. chirp) and a determined set of frequency-domain complex data objects for a received reflection of a second transmitted signal (e.g. chirp).

In accordance with one or more implementations a transmitted signal comprises a frame of one or more chirps. In accordance with one or more implementations, for each chirp of a frame, a set of frequency-domain complex data objects is generated as described above. It will be appreciated that a particular frequency/distance bucket may be generated based on data for multiple objects at the same range, but different locations, and moving at different velocities. In accordance with one or more implementations, a complex data object from a frequency-domain set indicates a magnitude and phase for the frequency/distance corresponding to that complex data object.

To attempt to distinguish between objects, an approach can be utilized in which, for each frequency/distance bucket, the frequency-domain complex data objects for that frequency/distance for each chirp of the frame are utilized to generate, using another FFT operation, a Doppler set of complex data objects that can resolve different objects.

In accordance with one or more implementations, an FMCW radar sensor with multiple antennas determines an angle of arrival for a reflected signal based on a phase difference between a complex data object of a set of frequency-domain complex data objects for a first antenna and a corresponding complex data object of a set of frequency-domain complex data objects for a second antenna.

In accordance with one or more implementations, a method includes transmitting, by a radar sensor of an electronic device, a first signal representing a first frame; receiving, at a first receiver of the radar sensor, a second signal representing a reflected signal; determining, at the radar sensor based on mixing together the first signal and the second signal, a third signal representing an intermediate frequency signal; determining, at the radar sensor based on the third signal and using an analog to digital converter, a first set of values corresponding to the first frame, each value of the first set of values being associated with a respective time; determining, at the radar sensor based on the first set of values and using a fast Fourier transform algorithm, a second set of values corresponding to the first frame, each value of the second set of values being associated with a respective frequency; determining, at the radar sensor based on the second set of values corresponding to the first frame and a third set of values corresponding to a second frame, a fourth set of values representing differences between a reflection of the first frame and a reflection of the second frame, each value of the fourth set of values being associated with a respective frequency; comparing, at the radar sensor, one or more values of the fourth set of values to a first threshold; based on the comparing, sending, from the radar sensor to a controller of the electronic device, a signal indicating that a first radar detection event has occurred; based on the signal, determining at the controller whether a configured first number of radar detection events have occurred within a configured first time interval; determining, at the controller and using the fourth set of values, a signal characteristic score for the first radar detection event; comparing, at the controller, the signal characteristic score to a second threshold; and based on the comparing of the signal characteristic score to the second threshold, generating image data using a camera of the electronic device.

In accordance with one or more implementations, an electronic device includes a camera; a radar sensor; one or more processors; and one or more computer readable media storing processor executable instructions which, when executed using the one or more processors, cause the electronic device to perform operations comprising receiving a first signal generated by the radar sensor indicating a first radar detection event, based on the receiving of the first signal, determining whether a configured first number of radar detection events have occurred within a configured first time interval, receiving first radar data from the radar sensor corresponding to the first radar detection event, the first radar data representing frequency-domain radar data for a plurality of frequency bins that indicates, for each respective frequency bin, a respective amplitude value for a difference from a current radar frame to a previous radar frame, determining, using the first radar data, a first signal characteristic score for the first radar detection event, comparing the first signal characteristic score to a first threshold, and based on the comparing of the first signal characteristic score to the first threshold, causing the camera of the electronic device to generate image data.

In accordance with one or more implementations, the one or more computer readable media store processor executable instructions which, when executed using the one or more processors, cause the electronic device to perform operations comprising determining, using the first radar data, a first set of amplitude values representing the highest amplitude values for the plurality of frequency bins, a size of the first set being determined based on a configured value; determining, using the first radar data, an amplitude ratio between a highest amplitude value of the first set and a lowest amplitude value of the first set; clipping the amplitude ratio at a configured clip value if it exceeds the configured clip value; accessing first reference bin data indicating a reference bin of the plurality of frequency bins that corresponds to a reference distance; determining a second set of frequency bins having an amplitude value over a second threshold; selecting, from the second set of frequency bins, a first frequency bin corresponding to the least distance from the radar sensor; determining a first distance value quantifying a distance between the first frequency bin and the reference bin; clipping the first distance value at a configured clip value if it exceeds the configured clip value; determining, using the first radar data, a second set of frequency bins having the highest amplitude values of the plurality of frequency bins, a size of the second set being determined based on a configured value; determining, for each respective frequency bin of the second set, a respective distance value; determining, based on the respective distance values, an average distance value; determining a second distance value indicating a difference between the average distance value and the reference distance; clipping the second distance value at a configured clip value if it exceeds the configured clip value; determining a third set of frequency bins of the plurality of frequency bins defined relative to the reference bin; determining a first number of frequency bins of the third set of frequency bins that have an amplitude value above a second threshold; determining a fourth set of frequency bins of the plurality of frequency bins defined relative to the reference bin; determining a second number of frequency bins of the fourth set of frequency bins that have an amplitude value above a second threshold; determining a fifth set of frequency bins of the plurality of frequency bins defined relative to the reference bin; determining a third number of frequency bins of the fifth set of frequency bins that have an amplitude value above a third threshold; multiplying the first number by a first weight value to produce a first weighted value; multiplying the second number by a second weight value to produce a second weighted value; multiplying the third number by a third weight value to produce a third weighted value; determining a weighted sum value based on adding together the first weighted value, the second weighted value, and the third weighted value; wherein the first signal characteristic score is determined based on summing together amplitude ratio, the first distance value, the second distance value, and the weighted sum value.

In the above description, numerous details are set forth. It will be apparent, however, to one of ordinary skill in the art having the benefit of this disclosure that embodiments may be practiced without these specific details. In some instances, well-known structures and devices are shown in block diagram form rather than in detail to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:

receiving, by a processor from a radar unit, radar data comprising a plurality of values, each value corresponding to one of a plurality of distance bins, wherein each value represents a magnitude of radar returns corresponding to a frequency chirp emitted by the radar unit, wherein each distance bin corresponds to a discrete distance from the radar unit;

determining, by the processor based on the radar data, that a candidate detection event has occurred;

generating, by the processor responsive to determining that the candidate detection event has occurred, a confidence score using signal characteristics of the radar data, the confidence score representing a level of certainty that the candidate detection event comprises actual motion of an object, wherein generating the confidence score using the signal characteristics comprises:

identifying a first value of a first distance bin of the plurality of distance bins, wherein the first value is a first peak of the plurality of values;

identifying a second value of a second distance bin of the plurality of distance bins, wherein the second value is a second peak of the plurality of values lower than the first peak;

determining a first score by generating a ratio between the first value to the second value;

identifying a reference distance bin corresponding to a third distance bin of the plurality of distance bins;

determining a second score based on subtracting a first distance corresponding to the first distance bin from a second distance corresponding to the reference distance bin;

identifying a third value of a fourth distance bin of the plurality of distance bins, wherein the third value is a third peak of the plurality of values, and wherein the third value is lower than the first value and higher than the second value;

determining a third score based on subtracting an average of the first distance and a fourth distance corresponding to the fourth distance bin from the second distance;

identifying a subset of the plurality of distance bins, wherein each distance that corresponds to a distance bin of the subset is within a pre-determined range of distances comprising the second distance;

determining a fourth score based on a count of the values corresponding to one of the subset of the plurality of distance bins which meet a dynamic threshold; and combining the first, second, third, and fourth scores based on a weighted sum to obtain the confidence score;

determining that the confidence score satisfies a confidence threshold, the confidence threshold representing a minimum level of certainty that the candidate detection event comprises actual motion of an object; and activating a process to capture video in response to the confidence score satisfying the confidence threshold.

2. The method of claim 1, further comprising:

bypassing, responsive to determining that the confidence score satisfies the confidence threshold, a sliding window filter for detecting a predetermined number of candidate detection events within a fixed-size window.

3. The method of claim 1, further comprising:

receiving, by the processor from the radar unit, second radar data comprising a second plurality of values, each value corresponding to one of the plurality of distance bins, wherein each value represents a magnitude of radar returns corresponding to a second frequency chirp emitted by the radar unit;

determining, based on the second radar data, that a second candidate detection event has occurred;

generating, responsive to a determination that the second candidate detection event has occurred, a second confidence score using second signal characteristics of the second radar data, the second confidence score representing a level of certainty that the second candidate detection event comprises actual motion of a second object;

determining that the second confidence score does not satisfy the confidence threshold; and incrementing a counter of a sliding window filter for detecting a predetermined number of candidate detection events within a fixed-size window.

4. A method comprising:

obtaining radar data from a radar unit;

determining, based on the radar data, that a candidate detection event has occurred;

determining signal characteristics of the candidate detection event, wherein the signal characteristics comprise a plurality of values;

identifying a first value of the plurality of values and a second value of the plurality of values, wherein the second value is greater than a subset of the plurality of values and the first value is greater than the second value;

generating a confidence score using the signal characteristics and based on a ratio between the first value and the second value;

determining that the confidence score satisfies a confidence threshold, the confidence threshold indicating a confidence that the candidate detection event is an actual detection event; and activating a process to capture one or more of an image or video in response to the confidence score satisfying the confidence threshold.

5. The method of claim 4 wherein, responsive to determining that the confidence score satisfies the confidence threshold, a sliding window filter signal processing technique for detecting a fixed number of candidate detection events from the radar data within a fixed-size timing window is not utilized.

6. The method of claim 4, further comprising:

obtaining second radar data from the radar unit;

determining, based on the second radar data, that a second candidate detection event has occurred;

determining second signal characteristics of the second candidate detection event;

generating a second confidence score using the second signal characteristics;

determining that the second confidence score does not satisfy the confidence threshold; and incrementing, responsive to a determination that the confidence score does not satisfy the confidence threshold, a counter of a sliding window filter signal processing technique for detecting a fixed number of candidate detection events from the radar data within a fixed-size timing window.

7. The method of claim 6, further comprising:

determining a value of the counter satisfies a filter threshold; and activating a process to capture one or more of an image or video in response to the value of the counter satisfying the filter threshold.

8. The method of claim 4, further comprising performing a computer vision analysis on the one or more of the image or the video.

9. The method of claim 4, wherein the plurality of values each correspond to one of a plurality of distances from the radar unit, wherein determining the confidence score comprises:

identifying a reference distance that corresponds to a first distance of the plurality of distances, wherein determining that the candidate detection event has occurred uses the reference distance;

identifying a highest value of the plurality of values, wherein the highest value corresponds to a second distance of the plurality of distances; and determining a third distance between the reference distance and the second distance.

10. The method of claim 4, wherein the plurality of values each correspond to one of a plurality of distances from the radar unit, wherein determining the confidence score comprises:

identifying a reference distance that corresponds to a first distance of the plurality of distances, wherein determining that the candidate detection event has occurred uses the reference distance;

identifying a highest value of the plurality of values, wherein the highest value corresponds to a second distance of the plurality of distances, wherein the second value corresponds to a third distance of the plurality of distances;

generating a fourth distance by averaging the second distance and the third distance; and determining a fifth distance between the reference distance and the fourth distance.

11. The method of claim 4, wherein the plurality of values each correspond to one of a plurality of distances from the radar unit, wherein determining the confidence score comprises:

identifying a reference distance that corresponds to a first distance of the plurality of distances, wherein determining that the candidate detection event has occurred uses the reference distance;

determining a subset of the plurality of distances, wherein the subset comprises the first distance; and comparing each value corresponding to one of the subset to a dynamic threshold.

12. The method of claim 11, further comprising:

determining that a third value satisfies the dynamic threshold, the third value corresponding to a second distance of the subset, wherein the second distance is less than the first distance;

identifying a first weight for the third value;

determining that a fourth value satisfies the dynamic threshold, the fourth value corresponding to a third distance of the subset, wherein the third distance is greater than the first distance;

identifying a second weight for the fourth value, wherein the first weight is different than the second weight; and combining the first weight and the second weight.

13. A device comprising:

a radar unit;

a camera;

a memory device to store radar data, wherein the radar data comprises signal characteristics of radar returns observed by the radar unit, wherein the signal characteristics comprise a plurality of values; and a processor coupled to the memory device, wherein the memory device stores processor executable instructions which, when executed using the processor, cause the device to perform operations comprising:

determining, based on the radar data, that a candidate detection event has occurred;

identify a first value of the plurality of values and a second value of the plurality of values wherein the second value is greater than a subset of the plurality of values and the first value is greater than the second value;

generate a confidence score using the signal characteristics and based on a ratio between the first value and the second value;

determine that the confidence score satisfies a confidence threshold, the confidence threshold indicating a confidence that the candidate detection event is an actual detection event; and activate a process to capture, using the camera, one or more of an image or video in response to the confidence score satisfying the confidence threshold.

14. The device of claim 13 wherein, responsive to determining that the confidence score satisfies the confidence threshold, a sliding window filter signal processing technique for detecting a fixed number of candidate detection events from the radar data within a fixed-size timing window is not utilized.

15. The device of claim 13, wherein the processor executable instructions, when executed using the processor, cause the device to perform operations comprising:

obtaining second radar data from the radar unit;

determining, based on the second radar data, that a second candidate detection event has occurred;

determining second signal characteristics of the second candidate detection event;

generating a second confidence score using the second signal characteristics;

determining that the second confidence score does not satisfy the confidence threshold; and incrementing, responsive to a determination that the confidence score does not satisfy the confidence threshold, a counter of a sliding window filter signal processing technique for detecting a fixed number of candidate detection events from the radar data within a fixed-size timing window.

16. The device of claim 15, wherein the processor executable instructions, when executed using the processor, cause the device to perform operations comprising:

determining a value of the counter satisfies a filter threshold; and activating a process to capture one or more of an image or video in response to the counter satisfying the filter threshold.

17. The device of claim 13, wherein the plurality of values each correspond to one of a plurality of distances from the radar unit, wherein the processor executable instructions, when executed using the processor cause the device to perform operations to determine the confidence score comprising:

identifying a reference distance that corresponds to a first distance of the plurality of distances, wherein the processor uses the reference distance to determine that the candidate detection event has occurred;

identifying a highest value of the plurality of values, wherein the highest value corresponds to a second distance of the plurality of distances; and determining a third distance between the reference distance and the second distance.

18. The device of claim 13, wherein the plurality of values each correspond to one of a plurality of distances from the radar unit, wherein the processor executable instructions, when executed using the processor, cause the device to perform operations to determine the confidence score comprising:

identifying a reference distance that corresponds to a first distance of the plurality of distances, wherein the processor uses the reference distance to determine that the candidate detection event has occurred;

determining a subset of the plurality of distances, wherein the subset comprises the first distance; and comparing each value corresponding to one of the subset to a dynamic threshold.

\* \* \* \* \*